United States Patent [19]

Marks, Jr.

[11] Patent Number: 4,863,130

[45] Date of Patent: Sep. 5, 1989

[54] ADJUSTABLE DEVICE FOR MOUNTING AN ELECTRONIC IMAGING CAMERA TO A SURFACE BY VACUUM

[76] Inventor: Franklin J. Marks, Jr., 1430 Park Hills Ave., State College, Pa. 16803

[21] Appl. No.: 297,559

[22] Filed: Jan. 13, 1989

[51] Int. Cl.$^4$ ............................................. F16B 47/00
[52] U.S. Cl. ............................ 248/206.3; 248/205.3; 248/683; 354/293
[58] Field of Search ............... 248/206.3, 205.5, 205.6, 248/205.7, 205.8, 206.5, 359 A, 363, 467, 309.3, 205.3; 354/293

[56] References Cited

U.S. PATENT DOCUMENTS

| | | | |
|---|---|---|---|
| 3,176,602 | 4/1965 | Wilt | 248/205.5 |
| 3,638,889 | 2/1972 | Samuelson | 248/206.3 |
| 4,648,572 | 3/1987 | Sokol | 248/206.3 X |
| 4,696,447 | 9/1987 | Strecker | 248/206.3 |

*Primary Examiner*—Ramon O. Ramirez

[57] ABSTRACT

A support bracket for attaching an electronic imaging camera to a surface by vacuum comprised of suction cups attached to a bracket that is hinged to a second bracket that a camera is pivotally attached to. Also a mirror assembly that can be attached to the second bracket to provide a mirror image view for the camera when used on a vehicle as an electronic rear view mirror. This support bracket allows easy change of location and field of view of an electronic imaging camera while it is also capable of being adjusted to provide a horizontally aligned field of view for the camera.

9 Claims, 3 Drawing Sheets

ADJUSTABLE DEVICE FOR MOUNTING AN ELECTRONIC IMAGING CAMERA TO A SURFACE BY VACUUM

BACKGROUND

1. Field Of Invention

This invention relates to camera mounts, especially to electronic imaging camera mounts that are adjustable so as to provide for a horizontally aligned field of view. This invention also relates to camera mounts that attach to windows or other smooth surfaces by means of a vacuum device or devices, usually suction cups, to facilitate easy installation and removal and for not damaging the surface that it is mounted on. Also electronic imaging camera mounts that provide for easy attachment of the camera to the mount and electronic imaging camera mounts that provide a means of producing a mirror image.

2. Description Of Prior Art

Many, if not most electronic imaging observation cameras prior to this invention have required a mounting that was permanently attached to some structure. This required considerable installation time and caused damage to the surface to which they were mounted. If the mount used a clamping device it had to have surfaces it could be clamped onto.

In addition, if the camera had to be moved or removed a considerable amount of time was required in it's removal, and in the repair of the damage to the surface that it was mounted to. This meant that even if the camera could have been used in another location from time to time it was easier and cheaper to use a second camera.

If a mount such as a unattached tripod was use it was subject to being bumped out of alignment by any passerby, also it required a large amount of floor space to accommodate it.

In the case of electronic imaging cameras used on vehicles as electronic rear view mirrors the cameras had to be permanently attached to the outside of the vehicle, requiring a weather proof housing and some form of vibration isolation to protect the camera from damaging high frequency vibrations, this made for high installation costs and because the camera was mounted on the outside of the vehicle this left the camera subject to theft or vandalism, also the image had to be reversed to provide a mirror image, this required a special reverse image camera or video monitor. The requirements of an electronic rear view mirror meant that the camera would be dedicated to that use.

The field of search showed no prior art patent for support by vacuum of a electronic imaging camera. However a method of support was found on the market unlike that of the present invention. It is manufactured by TransCam Systems. It is a video rear view mirror system that uses double faced foam tape to permanently mount the video camera to the inside of the rear window in a travel trailer or motor home. Once mounted it can not be adjusted or easily removed.

Most users, would find it desirable to have a electronic imaging camera mounting device which would facilitate easy installation and removal. The mounting device should also provide the advantages of a permanent mount, mainly adjustability to produce a horizontally aligned field of view and stability. Also it would be desirable to have the camera be able to look out of a window, and in the case of an electronic rear view mirror it would be an advantage not to have the need for special reverse image camera or video monitor. Allowing the camera or video monitor to be used for other purposes. Some form of vibration isolation would also be desirable. In the case of some motor homes and travel trailers a bedroom is in the rear of the vehicle and if the electronic imaging camera and mount were easily removed it would allow close fitting curtains or blinds to be closed.

OBJECTS AND ADVANTAGES

Accordingly I claim the following as my objects and advantages of the invention. To provide a mounting device that is fully adjustable so that the field of view of the electronic imaging camera can be easily changed to look in any direction and yet provide a horizontally aligned field of view. To provide a mounting device for electronic imaging cameras that is easily installed onto glass or other smooth surfaces and that can be removed without damaging the surface to which they are mounted. To provide a mounting device that can be placed in any position and still support the electronic imaging camera. To provide a mounting device that once placed in position it will stay there over an extended period of time without further attention. To provide a mounting device that mounts onto glass so that the camera can look through the glass.

In addition, I claim the following additional objects and advantages. To provide a mounting device that will isolate the electronic imaging camera from damaging high frequency vibrations when used on a vehicle. To provide a mounting device that has an attachable mirror assembly to provide a mirror image view when used on a vehicle as an electronic rear view mirror. Thus eliminating the need for a special reverse image camera or video monitor.

Readers will find further objects and advantages of the invention from a consideration of the ensuing description and the accompanying drawings.

DETAILED DESCRIPTION

Figure 6:
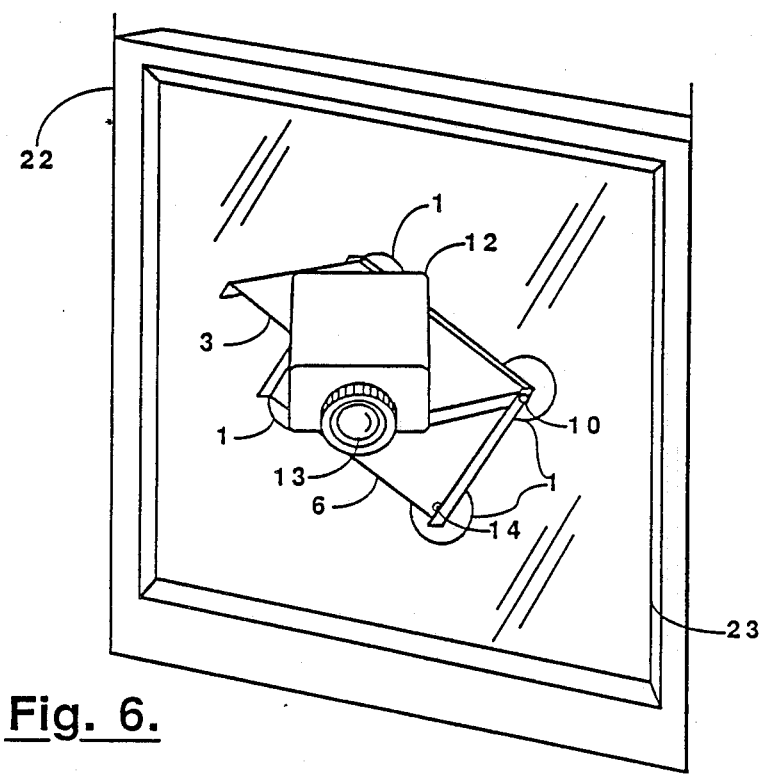
FIG. 6 is a perspective of a electronic imaging camera mounted to a window pane by the mounting device of the present invention.

It is a feature of the invention that the mounting device can be adjusted so that a electronic imaging camera can look in any direction and still have a horizontally aligned field of view. FIG. 6 shows the mounting device of this invention attached to the inside of the window 22 on the window glass 23 with the camera looking down and off to the side into a room. To allow the field of view of the camera to be horizontally aligned the mounting device needs to have three axes of adjustment but the mounting device of this invention appears to have only two, the camera mounting bolt 9 (FIG. 1) axes and the adjustment locking bolts 10 axes, but there is a third, the axes about which the suction cup bracket 3 can rotate because it can be attached to the window glass 23 at any angle in the plane of the window glass 23. In FIG. 6 the suction cup bracket 3 is attached onto the inside of the window glass 23 at an angle that allows the electronic imaging camera to look down and off to the side while maintaining a horizontally aligned field of view.

Figure 5:
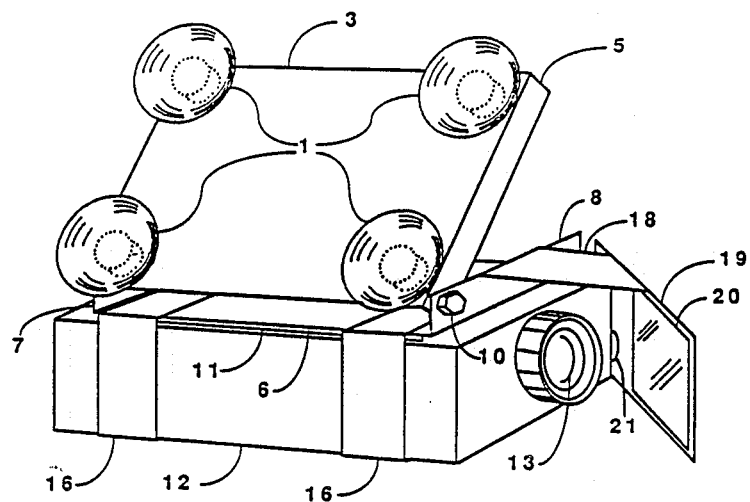
FIG. 5 shows a perspective view of a mounting device for electronic imaging cameras when used as an electronic rear view mirror.

In the case of the electronic rear view mirror mount of FIG. 5 the ability to rotate the suction cup bracket 3 in the plane of the mounting surface allows the image to be adjusted horizontally to correct for variations if the image reversal mirror 20 is not at 45 degrees to the plane of the lens 13. If the angle is not 45 degrees and the camera bracket 6 is adjusted so that the field of view of the camera is looking up or down the suction cup bracket 3 will need to be rotated in the plane of the mounting surface to yield a horizontally aligned image. Also the resilient material that the suction cups 1 are made of provides a means to help isolate the camera body 12 from high frequency vibrations generated while the vehicle is in motion.

Figure 1:
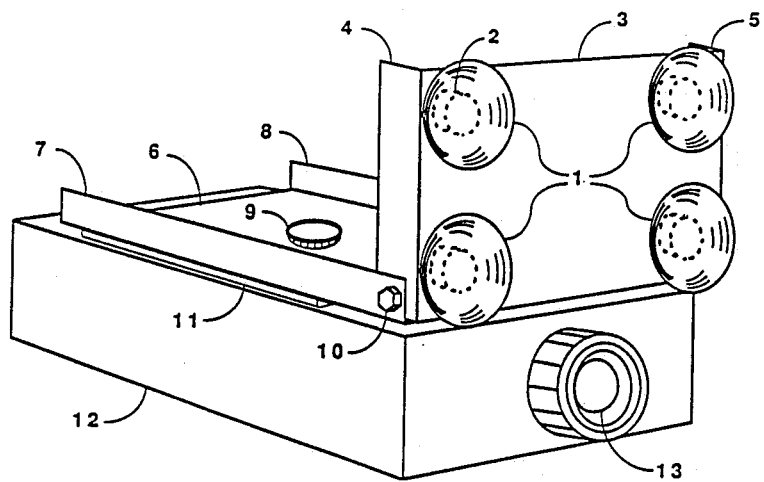
FIG. 1 shows a perspective view of a mounting device for electronic imaging cameras using suction cups with a camera attached to the mount by a bolt.

FIG. 1 shows a electronic imaging camera mounting device according to the preferred embodiment of the invention. The mounting device comprised of four suction cups 1 mounted to suction cup mounting bracket 3 by four suction cup mounting screws 14 (FIG. 2) that project through four holes (not shown) in the suction cup mounting bracket 3 and that screw into the rearward extending suction cup bosses 2. The suction cup mounting bracket 3 is formed into a channel in which a hole (not shown) is located at the bottom end of each of the sides 4 and 5. The suction cup mounting bracket 3 and the camera mounting bracket 6, which is also formed into a channel in which a hole (not shown) is located at the front end of each of the sides 7 and 8, are joined by the adjustment locking bolts 10 (right side shown in fig. 5). The adjustment locking bolts 10 project through the left and right holes (not shown) in the respective brackets and are screwed into the their respective locking nuts (not shown). After the angle between the two brackets 3 and 6 has been set the adjustment locking bolts 10 are tighten to maintain this angle. In the middle of the camera mounting bracket 6 is a camera mounting bolt hole (not shown) through which the camera mounting bolt 9 projects downward. There is a friction pad 11 attached to the bottom of the camera mounting bracket 6 that has a hole (not shown) through which the camera mounting bolt 9 also projects. The camera mounting bolt 9 then screws into the top threaded mounting hole (not shown) on the camera body 6. The friction pad 11 provides fiction between the camera mounting bracket 6 and the camera's body 12 so that when the camera body 12 is positioned and the camera mounting bolt 9 is tightened, the camera body 12 will remain in position.

Figure 2:
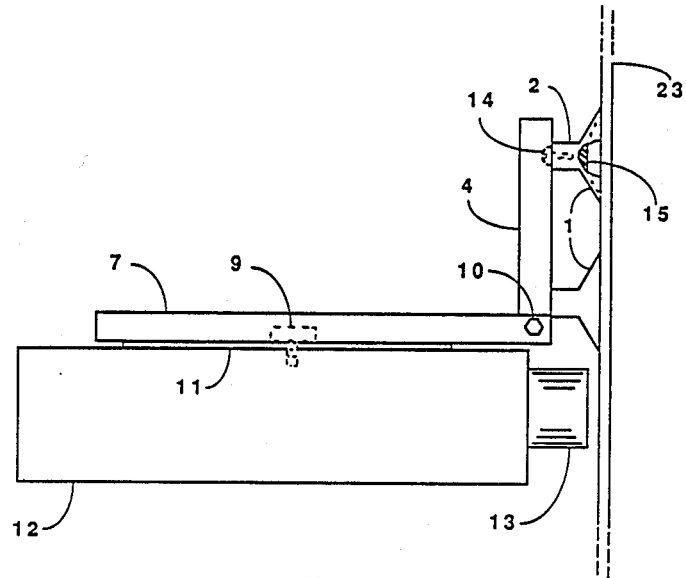
FIG. 2 is a side view showing a electronic imaging camera mounted on a window with a mounting device according to the embodiment shown in FIG. 1.

FIG. 2 shows a feature of the invention that when the mounting device of this invention is placed on a window 23 by pressing the concave surface 15 of the suction cups against the window 23 the camera body 12 can be adjusted so that the lens 13 is looking ouf the window. By loosening the adjustment locking bolts 10 the camera mounting bracket 6 can be angled so that the camera can look down. If it is desired that the camera look up, the mounting device of this invention can be flipped so that the camera mounting bracket 6 is on top, most observation cameras have threaded mounting holes on the top and bottom of their camera bodies, the bottom threaded mounting hole (not shown) would then accept the camera mounting bolt 9.

Figure 3:
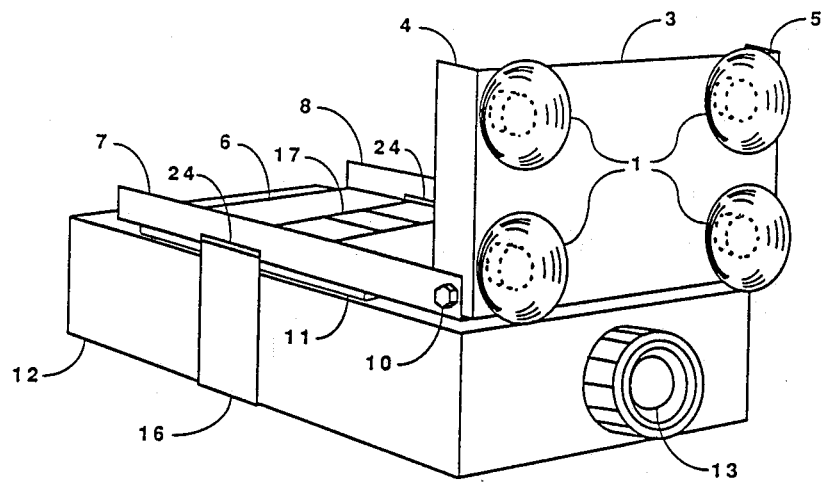
FIG. 3 shows a perspective view of a mounting device for electronic imaging cameras using suction cup with a camera attached to the mount by a strap.
Figure 4:
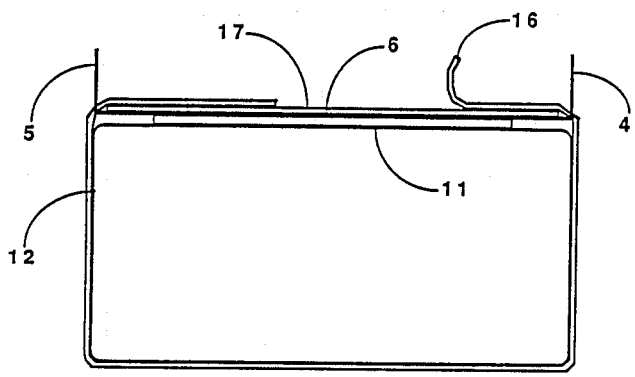
FIG. 4 shows the detail of the mounting strap in FIG. 3.

FIG. 3 shows a second embodiment of the invention where the camera body 6 is attached to the camera mounting bracket 6 by means of a loop faced strap 16 and an adhesive backed hook faced strip 17. FIG. 4 is a rear view of the camera body 12 and the camera mounting bracket 6 showing the adhesive backed hook faced strip 17 mounted onto the top surface of the camera mounting bracket 6. A portion of the loop faced strap 16 is attached to the left side of the hook faced strip 17 by pressing the loop and hook faces together. The loop faced strap 16 then passes through the left strap slot 24 (FIG. 3) around the camera body 6 through the right strap slot 24 (FIG. 3) then drawn tight and then attached to the right portion of the hook faced strip 17. A portion of the loop faced strap 16 is shown lifted off of the right side of the hook faced strip 17. Use of the loop faced strap 16 and the hook faced strip 17 provide for quick mounting of the camera to the mounting device of this invention.

FIG. 5 shows a electronic imaging camera mounting device according to another embodiment of the invention. When placed on the inside of a rear window of a vehicle such as a motor home or a travel trailer this mounting device allows a electronic imaging camera to be used as an electronic rear view mirror. The right side 8 of the camera mounting bracket 6 is attached by two sheet metal screws (not shown) to the left end of the mirror bracket 18. The mirror bracket 18 is attached to the mirror plate 19 so that the mirror plate 19 is held at approximately 45 degres to the plain of the lens 13. The mirror 20 is attached to the mirror plate 19 by means of double sided adhesive foam tape (not shown). The rubber bumper 21 is attached to the mirror plate 19 so that it rests on the front right edge of the camera body 12. This tends to dampen out any vibrations that are set up in the mirror bracket 18 and mirror plate 19 while the vehicle is in motion. The camera body 12 is attached to the camera mounting bracket 6 by two loop faced straps 16 and two hook strips (not shown). The camera is faced sideways so that the lens 13 looks into the mirror 20. The mirror is positioned so that the field of view of the camera is at a right angle to the direction the camera is facing. This provides the mirror image that is necessary for an electronic rear view mirror without the need for a special reverse image camera or video monitor. An other advantage of using the right angle mirror 20 is that the amount that the whole assembly projects out from it's mounting surface is reduced because the major axis of the camera is now parallel to the mounting surface. FIG. 5 also shows the angle between the suction cup bracket 3 and the camera mounting bracket 6 adjusted to less than 90 degrees.

While the above description contains many specifities, the reader should not construe these as limitations on the scope of the invention, but merely as exemplifications of preferred embodiments thereof. Those skilled in the art will envision many other possible variations that are within scope the invention. For example someone skilled in the art will readily be able to change the dimensions and shape of the various embodiments. They will also be able to make the mounting device out of alternative materials, such as plastic or wood. They can make many variations on the adjustment mechanisms. They can make many variations on the image reversing mirror and its bracket of FIGS. 5. They could use only one big suction cup. Accordingly the reader is requested to determine the scope of the invention by the appended claims and their legal equivalents, and not by the examples which have been given.

I claim:

1. An adjustable device for mounting an electronic image camera to a surface by vacuum, comprising:
   (a) vacuum means comprised of one or more vacuum devices which can be retained on a surface by vacuum and that can be removed from said surface by relieving the vacuum;
   (b) bracket means comprised of one or more brackets to hold said vacuum means;
   (c) attaching means for adjustable attachment of said electronic imaging camera to said bracket means;
   (d) locking means for restricting the movement in any axis of said attaching means so as to retain the field of view of said electronic imaging camera fixed after said attaching means has been adjusted;
   (e) said vacuum means being joined to said bracket means so as to be able to support said bracket means in a fixed position with respect to said surface when said vacuum means is retained on the said surface by vacuum.

2. The adjustable device of claim 1 wherein said vacuum means is comprised of one or more suction cups.

3. The adjustable device of claim 1 wherein said vacuum means is comprised of one or more suction cups having:
   (a) rearward extending bosses;
   (b) a means for attaching the said rear extending bosses to said bracket means.

4. The adjustable device of claim 1 wherein said bracket means comprises:
   (a) a bracket of sufficient size to accommodate said vacuum means.
   (b) holes necessary for attachment of said vacuum means in said bracket;
   (c) a means for adjustable attachment of said electronic imaging camera to said bracket so that said electronic imaging camera's field of view can be adjusted.

5. An adjustable device for mounting an electronic imaging camera to a surface by vacuum, comprising:
   (a) vacuum means comprised of one or more vacuum devices which can be retained on a surface by vacuum and that can be removed from said surface by relieving the vacuum;
   (b) bracket means comprised of one or more brackets to hold said vacuum means;
   (c) second bracket means comprised of a second bracket that attaches to said bracket means at a point or points so that said bracket and said second bracket shall act as a hinge;
   (d) bracket locking means providing for locking of the said attachment point or points.
   (e) attaching means for adjustable attachment of said electronic imaging camera to said second bracket means;
   (f) locking means for restricting the movement of said attaching means so as to retain the field of view of said electronic imaging camera fixed after said attaching means has been adjusted;
   (g) said vacuum means being joined to said bracket means so as to be able to support said bracket means in a fixed position with respect to said surface when said vacuum means is retained on the said surface by vacuum.

6. The adjustable device of claim 5 wherein said vacuum means is comprised of one or more suction cups.

7. The adjustable device of claim 5 wherein said bracket means comprises:
   (a) a bracket or brackets of sufficient size to accommodate said vacuum means.
   (b) hole or holes necessary for attachment of said vacuum means in said bracket or brackets;
   (c) hole or holes in said bracket means necessary for attachment of said bracket means to said second bracket means at the said attachment point or points.
   (d) a bolt or bolts adapted to project through said hole or holes at the said attachment point or points then screw into a nut or nuts so as to lock said attachment point or points.

8. The means providing for the adjustable attachment of said electronic imaging camera to the said second bracket of claim 5 comprises:
   (a) a hole positioned centrally in the said second bracket;
   (b) a bolt adapted to screw into a threaded hole on said electronic imaging camera for the purpose of adjustable attachment of said electronic imaging camera;
   (c) the said bolt projects through said hole in said second bracket then screws into the said threaded hole on the said electronic imaging camera.
   (d) a means for providing friction between said second bracket and the body of said electronic imaging camera.

9. The adjustable device of claim 5 wherein said attaching means for adjustable attachment comprises:
   (a) an adhesive backed hook faced or loop faced strip;
   (b) a mating faced strap to the adhesive backed strip;
   (c) the said adhesive backed strip is attached by its adhesive backing to the opposite surface of the said second bracket to which the said electronic imaging camera is to be attached.
   (d) a short portion of the said mating faced strap is attached to one end of the said adhesive backed strip by pressing the mating faces together;
   (e) the remaining portion of the said mating faced strap is then passed around the electronic imaging camera's body, pulled tight and then attached to the other end of the said adhesive backed strip by pressing the mating faces together.

* * * * *